June 26, 1934.  D. E. LINDQUIST  1,964,474

METHOD OF MANUFACTURING FITTINGS

Filed Dec. 13, 1933  2 Sheets-Sheet 1

David E. Lindquist,
Inventor,
Delor G. Haynes,
Attorney.

June 26, 1934.    D. E. LINDQUIST    1,964,474
METHOD OF MANUFACTURING FITTINGS
Filed Dec. 13, 1933    2 Sheets-Sheet 2

David E. Lindquist,
Inventor,
Delos G. Haynes,
Attorney.

Patented June 26, 1934

1,964,474

UNITED STATES PATENT OFFICE 1,964,474

METHOD OF MANUFACTURING FITTINGS

David E. Lindquist, Port Huron, Mich., assignor to Muller Brass Co., Port Huron, Mich., a corporation of Michigan Application December 13, 1933, Serial No. 702,118

4 Claims. (Cl. 29—157)

This invention relates to methods of manufacturing fittings and with regard to certain more specific features, to fittings for joining pipe, rods and the like.

Among the several objects of the invention may be noted the provision of a method of manufacturing fittings of the class described which is simple and economical in operation and which produces a fitting of accurate dimension characteristics and the like; the provision of a method of manufacturing a joint which can be made easier and faster, as it is unnecessary to apply any solder to the joint while the assembly is being heated; a method of manufacturing a joint of the soldered type which is more economical from the standpoint of solder consumption; and the provision of a method of manufacturing a joint which is neater in appearance.

Other objects will be in part obvious and in part pointed out hereinafter.

The invention accordingly comprises the elements and combinations of elements, steps and sequence of steps, features of construction and arrangements of parts, which will be exemplified in the structures and methods hereinafter described, and the scope of the application of which will be indicated in the following claims.

In the accompanying drawings, in which are illustrated several of various possible embodiments of the invention, Fig. 1 is a side elevation partly in section, of a cast fitting;

Similar reference characters indicate corresponding parts throughout the several views of the drawings.

The present invention relates generally to the manufacture of fittings of the general type shown in Hill Patent 1,770,852, in that the fitting of the present invention, like that of the said Hill patent, is adapted to secure a pipe or the like therein by means of a thin film of solder positioned between the pipe and the fitting, the solder having been spread between the pipe and fitting while in its liquid state by capillary action. The fitting of the present invention also embodies certain of the principles of Mueller, et al., Patent 1,801,171, to the extent that it is formed with a pre-inserted ring of solid solder therein, the ultimate joint being effected by melting this pre-inserted ring of solder after the pipe is in position in the fitting.

Insofar as the features of the fitting of the present invention duplicate features of the said Hill and Mueller, et al., patents, the present invention may be said to comprise the method of manufacturing the fitting, as contrasted to the fitting, per se.

Figure 1:
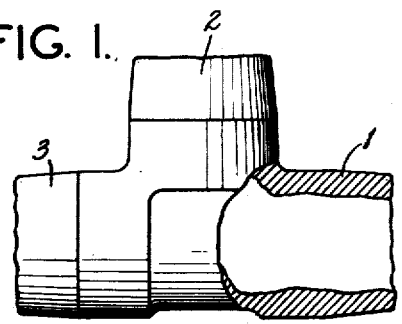

Experience has shown that the most advantageous method of manufacturing fittings of the type herein concerned includes as a first step the casting of a suitable metal in the rough form of the fitting desired. The metal to be employed varies with the conditions under which the finished fitting is to be used. Under various conditions, copper, bronze, brass, and aluminum have been found to be satisfactory metals. Fig. 1 illustrates this rough cast fitting, a T-fitting being chosen by way of example. It is of course to be understood that other forms of fittings, such as nipples, Ls, bends, crosses, reducers, manifolds, etc., are within the scope of the invention.

Referring to Fig. 1, numerals 1, 2, and 3 indicate the three pipe-receiving sockets which are customary in a T-fitting. For present purposes it may be considered that these three sockets are identical, although it is frequently the case in practical usage that the sockets are of different diameter. The succeeding steps of the invention will be described with relation to but one of the sockets, 1, but it is to be understood that the other sockets are to be handled in a similar manner. The socket 1, it will be seen, is roughly in the desired final shape, but its dimensions are not accurate and its surfaces are not ideal for spreading of the solder in making a joint with the fitting.

Figure 2:
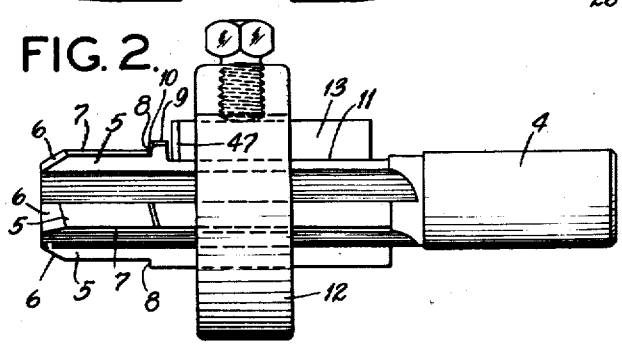
Fig. 2 is a side elevation of a rough boring tool.
Figure 3:
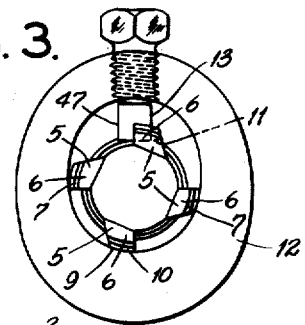
Fig. 3 is a front-end elevation of the tool of Fig. 2.

The first step in finishing the fitting of Fig. 1 comprises roughly boring out the sockets 1 with the tool shown in Fig. 2. This tool generally resembles a reamer, having a shank 4 adapted to be received by the tool holder of a lathe or other machine tool from which shank radially extend four cutting blades 5. Each blade 5 has a forward cutting edge 6 at an angle to the shank 4, a cutting edge 7 parallel to the shank 4, a cutting edge 8 perpendicular to the shank 4, and a cutting edge 9 parallel to the shank 4, but at a greater radial distance than the edge 7. Between the edges 8 and 9 is a sloping cutting edge 10. One of the blades 5 has a cut-away flat portion 11 thereon. On the flat 11 is held, by a dog 12, a facing blade or cutter 13, which comprises a rectangular block having a front cutting edge 47. By loosening the dog 12, the blade 13 may be adjusted longitudinally on the tool.

Figure 4:
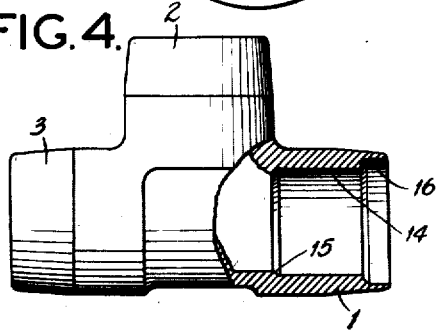
Fig. 4 is a side elevation similar to Fig. 1 showing the fitting after it has been operated upon by the tool shown in Fig. 2.

When this tool is rotated at a relatively high speed or the revolving work brought against the tool, and the socket 1 of the cast fitting is forced thereover, the fitting assumes the form shown in Fig. 4. The socket 1 now comprises a cylindrical portion 14, bottomed by a tapered portion 15, and provided at its outer end with a cylindrical portion 16 of greater diameter. The portion 14 has been cut by the edges 7, the portion 15 by the edges 6, and the portion 16 by the edges 8, 9, and 10. The end of the fitting has been roughly flattened by the edge 47. None of these cutting operations have brought the socket to its final dimensions, but have so shaped it that it can readily be brought to final dimensions by the next, and finishing operation.

Figure 5:
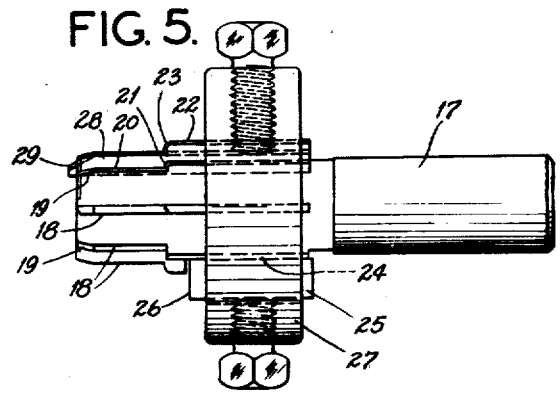
Fig. 5 is a side elevation of a finishing tool.
Figure 6:
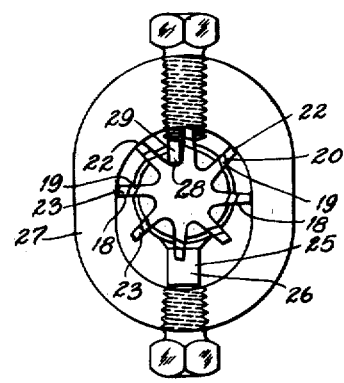
Fig. 6 is a front-end elevation of the tool of Fig. 5.

The next operation upon the fitting is performed with the tool shown in Fig. 5. This tool is a finishing reamer, and comprises a shank 17 from which radiate blades 18 (eight in number). Each blade 18 has a forward cutting edge 19 at an angle to the shank 17, a cutting edge 20 parallel to the shank 17, a cutting edge 21 perpendicular to the shank 17, and a cutting edge 22 parallel to the shank 17 but at a greater radial distance than the edge 20. A rounded cutting edge 23 joins the edges 21 and 22. As in the Fig. 2 tool, one of the blades 18 is provided with a flattened region 24 thereon, upon which is mounted a facing blade 25 having a cutting edge 26 perpendicular to the axis of the tool. A dog 27 holds the blade 25 in position. Sliding in a longitudinal slot in the shank 17, between two of the blades 18, is a burr-removing blade 28 having a cutting edge 29 at an angle to the axis of the tool. The blade 28 is also clamped in position by the dog 27, and is thereby made longitudinally adjustable.

The tool of Fig. 5 is likewise rotated at a relatively high speed and the socket 1 forced thereover. The tool then performs a finishing, reaming operation, bringing the fitting to the form shown in Fig. 7. The bottoming taper 15 has been broadened and brought accurately to size. The blade 28 has removed any burrs formed where this taper portion 15 ends in the interior of the fitting. The cylindrical portion 14 is smoothly finished and of the proper diameter, as is the larger-diameter cylindrical portion 16. The end of the fitting has also been finished at the proper size by the blade 25.

It will be noted that the larger-diameter cylindrical portion 16 has resulted in the formation of end walls 30 of the socket of considerably reduced, and hence weakened, thickness. This is intentional, as will be pointed out below.

Figure 7:
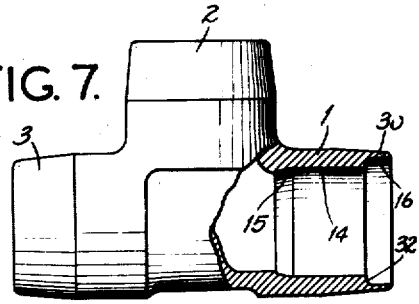
Fig. 7 is a side elevation similar to Fig. 1 showing the fitting after it has been operated upon by the tool of Fig. 5.
Figure 8:
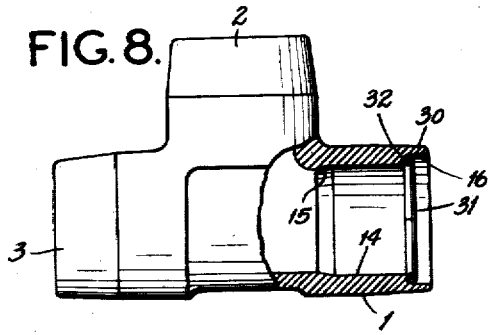
Fig. 8 is a view similar to Fig. 7, showing a subsequent step in the manufacture of the finished fitting.

The fitting as thus shown in Fig. 7 is ready for the next step, which comprises the insertion of a ring of solder material 31 (see Fig. 8) into the larger-diameter cylindrical portion 16. The ring 31 is desirably formed from wire of a diameter equal to the difference in radial dimensions of the portions 14 and 16, so that the ring, when in position in the fitting, forms in effect an extension of the cylindrical portion 14. However, the diameter of the wire may under certain circumstances be greater, or less, than this optimum dimension, in case it is desired to put more, or less, solder into the fitting. The composition of the ring 31 is of course suited to the metals employed in the fitting and the pipe to be joined thereto. An alloy of tin and lead serves well when the fitting (and pipe) are manufactured of copper, brass, or bronze. The ring 31, when in position, rests against a shoulder 32 which joins the cylindrical portions 14 and 16, as illustrated in Fig. 8.

Figure 11:
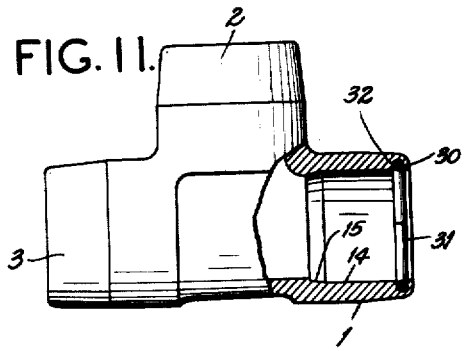
Fig. 11 is a side elevation similar to Fig. 1 showing the fitting after it has been operated upon by the tool shown in Fig. 9.

Next, and finally, the weakened end walls 30 of the socket are bent into position to retain the solder ring 31 in position, that is, to the form illustrated in Fig. 11. This is accomplished by a burnishing tool illustrated in Fig. 9. This tool comprises a shank 33, and a cylindrical body 34. In the front end of the body 34 is a dish-shaped declevity or recess 35. The body 34 is centrally bored to receive the end 36 of a pilot piece 37, the piece 37 being shaped accurately to fit within the portions 14 and 15 of the socket. Radial slots 38 in the body 34 lead inwardly to the recess 35.

The burnishing tool thus described is rotated at a relatively high speed and the fitting, with the solder ring 31 therein, is forced over the pilot 37. The edges of the recess 35 then engage the weakened end walls 30 and, due to the shape of the recess 35, bend said walls inwardly to clamp the ring 31 in position. The pilot 37 prevents the walls 30 from being bent in so far as to obstruct pipe entering the socket. The finished fitting, shown in Fig. 11, thus has the same diameter at its end as it does in the cylindrical portion 14.

Figure 9:
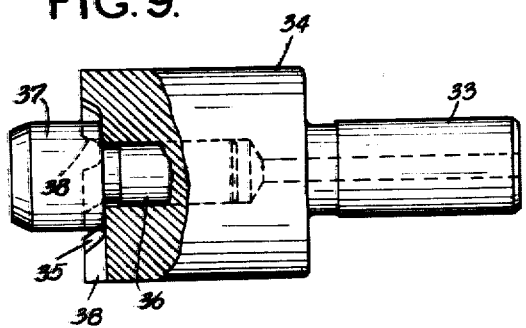
Fig. 9 is a side elevation, partly in section, of a burnishing tool.
Figure 12:
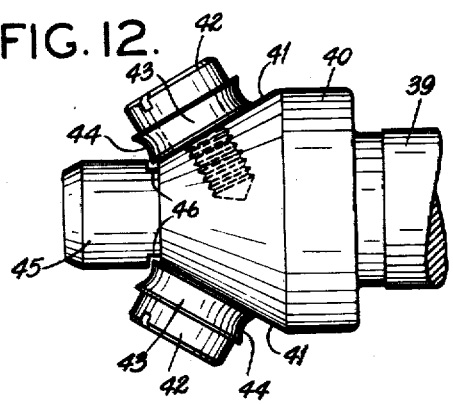
Fig. 12 is a side elevation of a rolling tool.
Figure 10:
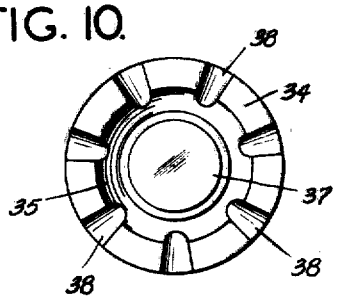
Fig. 10 is a front-end elevation of the tool of Fig. 9.
Figure 13:
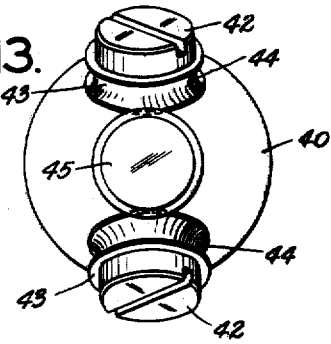
Fig. 13 is a front-end elevation of the tool of Fig. 12.

As an alternative to the burnishing tool shown in Fig. 9, the final operation may be performed by rolling the end walls 30 into position with the rolling tool shown in Fig. 12. This tool comprises a shank 39 and a body portion 40. The body 40 is provided with two (or more or less) flat, sloping faces 41, upon which are pivoted, as by studs 42, a pair of rollers 43. The edges of the rollers 43 are indented as indicated at numeral 44, thus giving them somewhat the appearance of pulleys or sheives. A pilot 45 extends from the front end of the body 40, similar in most respects to the pilot 37 of the tool shown in Fig. 9, but provided with a pair of notches 46 to receive the lower edges of rollers 43.

This tool is also used by rotating it or the fitting, and slipping the fitting on to the pilot 45. The rollers 43 then engage the weakened end walls 30, and by reason of their shaping, roll said end walls into position to clamp the solder ring 31 in position. The pilot 45 also prevents rolling the walls 30 too far. The resulting fitting is essentially the same as that produced by the Fig. 9 tool, or as illustrated in Fig. 11.

The method of manufacturing as thus described is more advantageous to employ than prior methods for the following reasons:

Usual spinning operations were more intended to give a resulting correct outside appearance only. The present invention provides for a proper inside shape, as between the shoulder 32 of the fitting, the correct placing of the solder in locked position in the fitting, the proper inside contact of the inner side of edge 30 with the solder, and the correct inside diameter of the solder ring 31, after it has been locked into place by the end 30 as in its final position. This results in making the article complete as a manufactured product so that when it is later joined to a pipe line, the inside surfaces 15 and 14, up to the outside edge of the fitting, require no special preparation before making the joint to a pipe line. For example, the tool of Fig. 12 provides for the proper diameter of the spun over end, which not only gives the proper capillary spacing but will also allow the solder to show at the end. This proves that a proper joint has been made.

Considered as distinct from the method by which it has been manufactured, the fitting of the present invention is also advantageous, for the following reasons:

In former fittings employing inside rings, such as locking rings, swivel rings, and the like, there were two methods used; first, to have a snap ring, and second, to pour the hot metal into a recess and let it solidify in that position. These methods were objectionable for the purpose of making pipe joints. In the case of a snap ring, this left a gap at one point at least and the air trapped in this point caused trouble, usually resulting in an unsatisfactory joint. Also it was necessary to have a larger groove to allow a ring of equal size to spring into place. Pouring molten metal into a groove was objectionable for several reasons, chief of which were the intricacy of handling fluid metal, and the fact that when the metal solidified it shrunk to some extent and for purposes of making a joint later, was objectionable on account of the oxide formed in the process of melting, pouring and cooling, which interfered with the making of a satisfactory joint. In making joints with high temperature solders, such as silver solder, only a short joint is necessary due to the high tensile strength of such solders and the tendency, under the high temperatures employed, for the solder to amalgamate to a great extent with the pipe and fittings. Further, as silver solders are relatively expensive, the lesser amount that can be used and still make a perfect joint, the more satisfactory. We find that on the ¾" nominal size fitting, a solder joint ¼" to ⅜" wide is sufficient. Now with such a short joint it is advisable to have the solder cover the full depth of the joint, at the same time show out at the end in a perfect ring which is positive visual proof that the joint is made perfectly.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

I claim:

1. The method of forming fittings of the class described comprising casting the fitting roughly to shape, boring the cast fitting to provide it with a socket and a portion at the end of the socket of greater diameter than the socket per se, reaming the fitting to finally dimension said socket and to finally shape said portion, inserting a ring of solder material into said portion, and bending the end of said socket inwardly to hold said solder ring in position.

2. The method as set forth in claim 1, in which the final bending step is accomplished by burnishing the end of the fitting.

3. The method as set forth in claim 1, in which the final bending step is accomplished by rolling the end of the fitting.

4. The method of providing a ring of solder material in a fitting of the class described comprising forming a cylindrical region in the end of the socket of the fitting, of greater diameter than the socket proper, thereby weakening the walls of the socket at the end thereof, inserting a ring of solder material into said region, and bending the weakened walls of the fitting to secure said solder ring in position.

DAVID E. LINDQUIST.

---

CERTIFICATE OF CORRECTION.

Patent No. 1,964,474.   June 26, 1934.

DAVID E. LINDQUIST.

It is hereby certified that the name of the assignee in the above numbered patent was erroneously described and specified as "Muller Brass Co." whereas said name should have been described and specified as Mueller Brass Co., as shown by the records of assignments in this office; and that the said Letters Patent should be read with this correction therein that the same may conform to the record of the case in the Patent Office.

Signed and sealed this 7th day of August, A. D. 1934.

Leslie Frazer (Seal)   Acting Commissioner of Patents.

the fitting, the correct placing of the solder in locked position in the fitting, the proper inside contact of the inner side of edge 30 with the solder, and the correct inside diameter of the solder ring 31, after it has been locked into place by the end 30 as in its final position. This results in making the article complete as a manufactured product so that when it is later joined to a pipe line, the inside surfaces 15 and 14, up to the outside edge of the fitting, require no special preparation before making the joint to a pipe line. For example, the tool of Fig. 12 provides for the proper diameter of the spun over end, which not only gives the proper capillary spacing but will also allow the solder to show at the end. This proves that a proper joint has been made.

Considered as distinct from the method by which it has been manufactured, the fitting of the present invention is also advantageous, for the following reasons:

In former fittings employing inside rings, such as locking rings, swivel rings, and the like, there were two methods used; first, to have a snap ring, and second, to pour the hot metal into a recess and let it solidify in that position. These methods were objectionable for the purpose of making pipe joints. In the case of a snap ring, this left a gap at one point at least and the air trapped in this point caused trouble, usually resulting in an unsatisfactory joint. Also it was necessary to have a larger groove to allow a ring of equal size to spring into place. Pouring molten metal into a groove was objectionable for several reasons, chief of which were the intricacy of handling fluid metal, and the fact that when the metal solidified it shrunk to some extent and for purposes of making a joint later, was objectionable on account of the oxide formed in the process of melting, pouring and cooling, which interfered with the making of a satisfactory joint. In making joints with high temperature solders, such as silver solder, only a short joint is necessary due to the high tensile strength of such solders and the tendency, under the high temperatures employed, for the solder to amalgamate to a great extent with the pipe and fittings. Further, as silver solders are relatively expensive, the lesser amount that can be used and still make a perfect joint, the more satisfactory. We find that on the ¾" nominal size fitting, a solder joint ¼" to ⅜" wide is sufficient. Now with such a short joint it is advisable to have the solder cover the full depth of the joint, at the same time show out at the end in a perfect ring which is positive visual proof that the joint is made perfectly.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

I claim:

1. The method of forming fittings of the class described comprising casting the fitting roughly to shape, boring the cast fitting to provide it with a socket and a portion at the end of the socket of greater diameter than the socket per se, reaming the fitting to finally dimension said socket and to finally shape said portion, inserting a ring of solder material into said portion, and bending the end of said socket inwardly to hold said solder ring in position.

2. The method as set forth in claim 1, in which the final bending step is accomplished by burnishing the end of the fitting.

3. The method as set forth in claim 1, in which the final bending step is accomplished by rolling the end of the fitting.

4. The method of providing a ring of solder material in a fitting of the class described comprising forming a cylindrical region in the end of the socket of the fitting, of greater diameter than the socket proper, thereby weakening the walls of the socket at the end thereof, inserting a ring of solder material into said region, and bending the weakened walls of the fitting to secure said solder ring in position.

DAVID E. LINDQUIST.

---

CERTIFICATE OF CORRECTION.

Patent No. 1,964,474.　　　　　　　　　　　　　　　　　　　June 26, 1934.

DAVID E. LINDQUIST.

It is hereby certified that the name of the assignee in the above numbered patent was erroneously described and specified as "Muller Brass Co." whereas said name should have been described and specified as Mueller Brass Co., as shown by the records of assignments in this office; and that the said Letters Patent should be read with this correction therein that the same may conform to the record of the case in the Patent Office.

Signed and sealed this 7th day of August, A. D. 1934.

Leslie Frazer (Seal)　　　　　　　　　　　　　　　　　　　　　Acting Commissioner of Patents.